United States Patent
Glavan et al.

(10) Patent No.: US 8,571,902 B1
(45) Date of Patent: Oct. 29, 2013

(54) REMOTE BIOMETRIC VERIFICATION

(75) Inventors: Michael J. Glavan, Edina, MN (US); Girish Gvalani, Eagan, MN (US); John A. Olson, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 2189 days.

(21) Appl. No.: 10/418,888

(22) Filed: Apr. 18, 2003

(51) Int. Cl.
*G06Q 10/00* (2012.01)

(52) U.S. Cl.
USPC .............................................. 705/5; 705/325

(58) Field of Classification Search
None
See application file for complete search history.

(56) References Cited

U.S. PATENT DOCUMENTS

| | | | |
|---|---|---|---|
| 5,280,527 A | 1/1994 | Gullman et al. | 380/23 |
| 5,572,596 A | 11/1996 | Wildes et al. | 382/117 |
| 5,613,012 A | 3/1997 | Hoffman et al. | 382/115 |
| 5,615,277 A | 3/1997 | Hoffman | 382/115 |
| 6,119,096 A | 9/2000 | Mann et al. | 705/5 |
| 6,926,203 B1 * | 8/2005 | Sehr | 235/492 |
| 7,086,591 B2 * | 8/2006 | Anderson | 235/384 |
| 2003/0149343 A1 * | 8/2003 | Siegel et al. | 600/300 |
| 2004/0059953 A1 * | 3/2004 | Purnell | 713/202 |
| 2004/0169076 A1 * | 9/2004 | Beale et al. | 235/382 |

OTHER PUBLICATIONS

Check-in firm checks out more markets Jul. 3, 2000 published in the Las Vegas Business Press.*
Mayer, Catherine, Check-in Kiosks-the unlikely Hero of Security, SITA copyright date 2002.*
Wilson, J.R., Airport Security desings revolve around biometrics, Military & Aerospace Electronics, Sep. 2002.*
Dubie, Denise, Flying with IBM, Network World, Oct. 21, 2002.*

* cited by examiner

*Primary Examiner* — Jami A Plucinski
(74) *Attorney, Agent, or Firm* — Robert P. Marley (57) ABSTRACT

An apparatus for and method of providing remote, self-service airport passenger check-in using a passenger verification provided by one or more personal identifiers, preferably a Personal Identification Number (PIN) and at least one biometric identifier. In the preferred mode, a remote check-in monitor is located in a passenger's hotel room or other convenient location. The passenger verification process requires between the personal identifier(s) and biometric identifier(s). Following passenger verification, the passenger is permitted to request a remotely printed boarding pass, remotely printed baggage claim tickets, etc. Details of the flight, such as seat selection, can also be defined or redefined from the remote site after successful passenger verification.

12 Claims, 11 Drawing Sheets

FIG. 1

| PIN | USER NAME | READING # |
|---|---|---|
| PIN X | USER A | READING # 1 |
| PIN Y | USER B | READING # 2 |
| ... | ... | ...... |
| PIN Z | USER C | READING # N |

SELECT AN AIRLINE:

- 182 — American
- 184 — British Airways
- 186 — Lufthansa
- 188 — Northwest
- 190 — Unisys Checkin (A, BA, L, NW, UN
- 192 — United

REMOTE BIOMETRIC VERIFICATION

CROSS REFERENCE TO CO-PENDING APPLICATIONS

U.S. patent application Ser. No. 10/418,985, filed Apr. 18, 2003, and entitled, "System and Method for Providing and Using Encoded Visual Identification Data Within a Transportation Security System"; U.S. patent application Ser. No. 10/418,477, filed Apr. 18, 2003, and entitled, "Improved Seat Assignment System and Method for an Airline Reservation System"; U.S. patent application Ser. No. 10/418,892, filed Apr. 18, 2003, and entitled, "Use of Biometric Device Integrated Into Self-Service Kiosk"; and U.S. patent application Ser. No. 10/418,933, filed Apr. 18, 2003, and entitled, "Self-to Service Airline Check In System and Method That is Airline Independent" are commonly assigned co-pending applications incorporated herein by reference.

BACKGROUND OF THE INVENTION

1. Field of the Invention

The present invention generally relates to self-service kiosks and more particularly relates to self-service kiosks having a remote self-service airline check-in system.

2. Description of the Prior Art

It is known in the prior art to engage in passenger check-in at airports. This has become a very expensive process for two major reasons. The first of these is the need for enhanced security in view of world events. As a result, the security resources, procedures, equipment, and personnel have continued to increase. This is likely to be a long term problem rather than one which simply corresponds to the current mood of the populace.

A second concern is increase of the personnel costs associated with passenger check-in. To be sure, this includes security matters, but it also involves issuing tickets, boarding passes, baggage claim checks, etc. all within expanding passenger expectations of flexibility, service, speed, efficiency, etc. Thus, the central focus for both of these concerns is personnel cost.

One of the functions of passenger check-in is passenger identification. The prior art tends to utilize various user/customer identification methods. Most common is the use of various cards for identification. It has been common to utilize a drivers license or passport for such identification, because each contains a photograph of the person to whom it is issued. Experience has shown that there are two basic problems with this type of identification. First the nature of a photograph is such that identification decisions must, at the current state of the art, be made by a human security attendant. This increases the cost of and tends to slow the identification process.

In an attempt to solve this problem, banks and other financial institutions now is employ self-service Automatic Teller Machines (ATM's) which permit user/customers to deposit/withdraw and perform other types of banking transactions without the attention of a human security attendant or teller. This was originally implemented with an identification card having a magnetically readable code attached thereto.

The second problem of the photograph identification process was also experienced early on with the ATM process In either case, the identification cards became easy to duplicate and/or forge. Thus, additional information became required to produce a more secure process. For ATM's it is now customary for the user/customer to be assigned a unique Personal Identification Number (PIN) to be used in conjunction with a magnetically read identification card. For photographic identification, various other factors are now utilized, including a second identifier, visual profiling, etc.

Some more recent solutions to these two problems involve machine readable or near machine readable biometric identifiers. Ideally, the biometric identifier chosen is unique to a give individual, such as finger prints, along with being reliably machine readable. U.S. Pat. No. 5,615,277, issued to Hoffman, describes a system employing machine reading of fingerprints as the identifier. U.S. Pat. No. 5,613,012, issued to Hoffman et al., shows a finger print reader providing secure access to a computer system. U.S. Pat. No. 5,280,527, issued to Gullman et al. shows a different approach to the use of finger prints as an identifier.

Using current technology, fingerprints tend to be somewhat difficult to read automatically by machine, particularly for real time access to services. A technique holding more promise for real time machine identification is imaging of the iris. Using this approach, a real time image is typically compared with a previously stored image. Security access is granted upon a machine match of the stored and real time images. U.S. Pat. No. 5,572,596, issued to Wildes et al., discusses such an approach. An improved technique is shown in U.S. Pat. No. 6,119,096, issued to Mann et al., which is incorporated herein by reference in its entirety. Nevertheless, Mann et al. places substantial reliance on security operator activity.

If the passenger identification matter can be resolved with no or minimal airport personnel involvement, it would be ideal to perform various other check-in services in this automated manner. However, in addition to security concerns, passenger check-in typically involves access to proprietary data and performance of individualized processes for each of the major airline carriers. Furthermore, there arises the question of whether the passenger need be physically present at the airport to accomplish the check-in functions. This matter arises because of the crowding found at most airports during peak travel times.

SUMMARY OF THE INVENTION

The present invention overcomes the disadvantages of the prior art by providing a technique which enables a self-service, unattended conducted highly reliable passenger check-in functions from a remote site. The preferred design revolves about a self-service kiosk which is particularly well adapted for location at the airport. Furthermore, it provides a standardized user interface which is nearly independent of the specific airlines(s) associated with a given passenger check-in. The remote site check-in involves remote electronic access to this self-service kiosk. Typically, this would mean that a passenger could perform check-in functions from his/her hotel room, for example.

In accordance with the preferred mode of the present invention, one or more biometric sensors, such as a finger print scanner, retina scanner, iris scanner, etc., are integrated into a self-service kiosk, making identification verification more difficult to circumvent. The remote check-in site has an equivalent biometric sensor(s). In addition to integrating the one or more biometric devices into the self-service kiosk, the current invention solves an additional problem related to system integration. Prior art biometric identification systems generally have a single software application that serves as both a user interface and the biometric signal processor. This software application receives biometric data that is collected from the user, compares that data to previously stored biometric samples, and provides an indication as to whether identification verification was completed successfully. As a result, any time the one or more biometric devices that collect the biometric data are changed in some way (for example a different device is installed that collects a different type of biometric data), the software application associated with the user inter face must be updated. This makes the system difficult and expensive to maintain.

In contrast to the prior art systems, the present invention does not integrate the biometric processing functionality with the user interface application. Instead, a user interface application is provided that interfaces with one or more biometric devices. The user interface application receives biometric data from these devices, but does not process this data. The data is routed to a dedicated biometric server that performs the data processing activities and completes identification verification. The biometric server then provides an indication to the user interface application as to whether the verification has completed successfully. The user interface application software is completely isolated from any of the specifics associated with processing of the biometric data. The system can therefore be described as "plug-and-play" processing of the biometric data. That is, virtually any typed of biometric device can be plugged into the one or more interfaces provided on the kiosk. The user interface that resides on the kiosk need not be changed to accommodate this type of system re-configuration.

Within this environment, passengers employ one or more user interface devices (keyboard, touch screen, mouse, etc.) to make requests to view and/or modify flight information, and/or to perform additional tasks such as make additional flight arrangements, and/or pront out flight tickets, boarding passes, and baggage claim checks. In prior art kiosks, passengers are required to select an airline before airline-specific requests can be made. For example, a user cannot view flight data for a particular United Airlines flight without first employing a user input device to select "United Airlines".

After passenger compliance with security procedures, a request to view flight information is made. This could be forwarded to the appropriate proprietary host system of the appropriate airline (e.g., United Airlines). The United Airlines host would retrieve the flight data for the current passenger using the passenger's name and address, social security number, or other data provided with the user request. The flight data would then be provided to the kiosk where it can be displayed to the user. If desired, the passenger could make seat assignment selections, book additional flights, print out tickets and other flight documents, etc. However, if the passenger had an itinerary that included multiple flights provided by multiple carriers, the above data transfers would need to be repeated for each carrier. As will be appreciated, this prior art technique can be relatively time-consuming. For example, the passenger may have a flight having four different legs, each on a different carrier. To obtain flight information and, if desired, print documents, the user must make four iterations through the above-described process. That is, four different requests for flight data must be made, each preceded by selecting the appropriate airlines.

According to the present invention, a check-in database is coupled to the kiosk server. The check-in database is a database cache that stores a subset of the database records stored within all of the other proprietary airline-specific host databases. These records are stored by passengers within the kiosk rather than by airlines. Records are cached within the check-in database on a periodic basis. More specifically, at periodic intervals, the kiosk server queries each proprietary airline host for all passenger records covering flights that will depart within a predetermined period of time, such as within the next 24 or 48 hours, from that airport. When the records are obtained, they are sorted according to unique user information such as a user's name and address and stored within check-in database. Using this cached data, the user is required to make only a single request to retrieve all current flight information.

In a preferred embodiment, a Unisys Check-In option is provided by the main menu. This option offers a list of all airlines serviced by the particular check-in kiosk. This makes the passenger instantly aware of the types of information available. For example, the passenger will be immediately cognizant of the extent to which the current process can deal with all legs of the current flight. In this manner, the passenger can perform all check-in functions without separate accesses to the different respective airline carriers.

At the preferred remote location, for example a hotel room, the passenger is provided with one or more corresponding biometric devices. In addition, one or more appropriate user interface devices are provided. Thus, the remote passenger check-in occurs in the same manner as if the passenger were checking in at the airport self-service check-in kiosk. In many cases, the hotel room location will provide display capabilities through the television set, already located within the hotel room.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 11 is a detailed flow chart showing remote check-in.

DETAILED DESCRIPTION OF THE PREFERRED EMBODIMENTS

Figure 1:
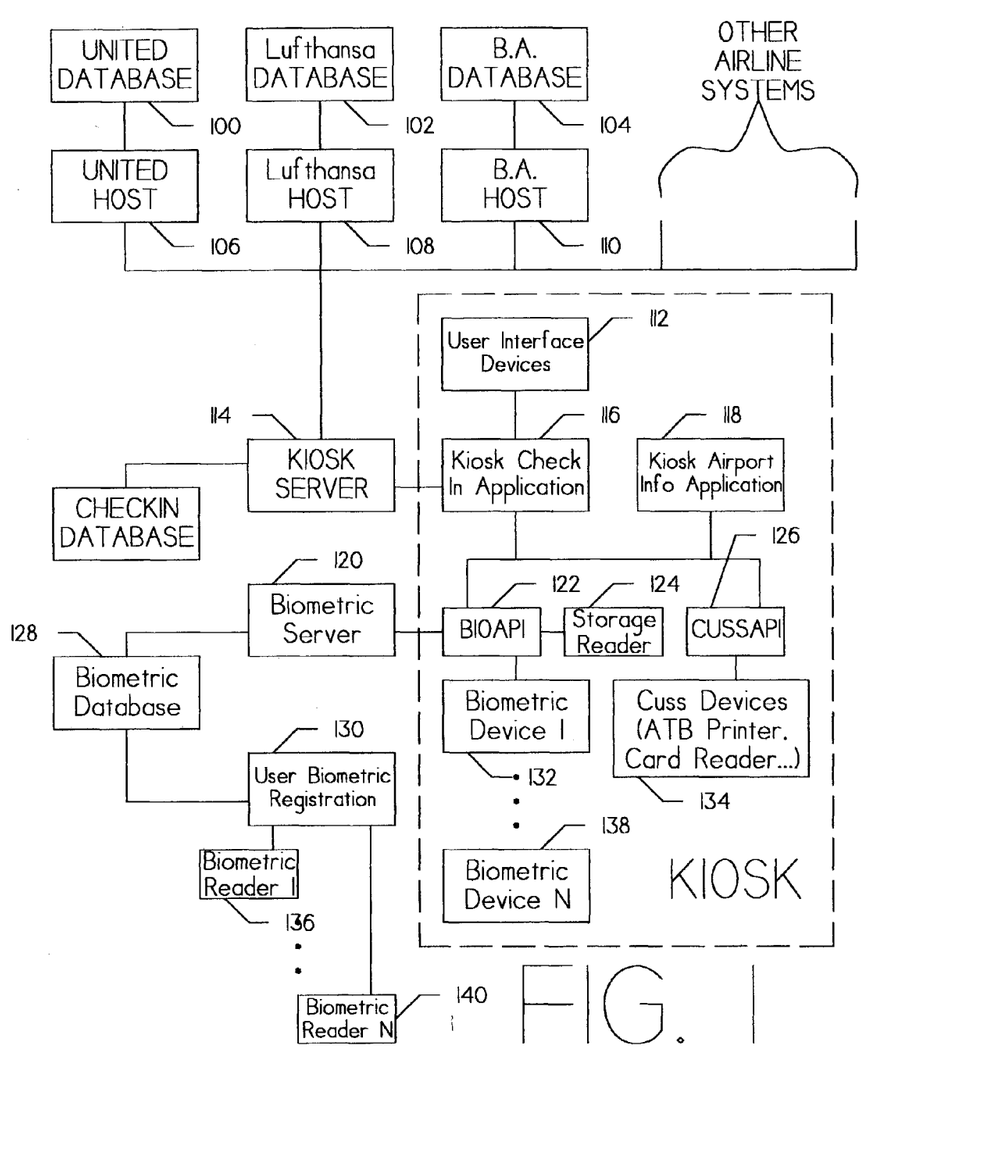
FIG. 1 is detailed block diagram showing the preferred embodiment of the present invention.

FIG. 1 is a detailed block diagram of the hardware of the present invention providing for on-site check-in. Shown are Airline #1 DataBase 100, Airline #2 DataBase 102, and Airline #3 DataBase 104 interfaced to the system via Airline #1 Host 106, Airline #2 Host 108, and Airline #3 Host 110, respectfully. Preferably also available are other airline systems which are not individually shown. A large number of participating carriers tends to ensure that most passengers can performed all desired check-in functions using a single process at a single self-server check-in kiosk.

The airline hosts (i.e., Airline #1 Host 106, Airline #2 Host 108, and Airline #3 Host no) are coupled to Kiosk Server 114, as shown. Kiosk Server 114 has its own CheckIn DataBase as shown. It is this Check-In DataBase which is periodically updated to provide a given passenger with access to proprietary data from a plurality of carriers in a single process. The features and operation of the Check-In DataBase is discussed in much greater detail below. Kiosk 101 is coupled to Kiosk Server 114 via Kiosk Check In Application 116. This interface permits Kiosk 101 to access prior airline data for completing real time check in.

User Interface Devices 112 permit the passenger to directly interact with Kiosk 101. These functions are discussed in more detail below. One or more Biometric Devices (i.e., Biometric Device 1-132 through Biometric Device N-138) provide Kiosk 101 with on-site biometric identification sensing. This one or more sensors is interfaced to Kiosk 101 via BioAPI (i.e., Biometric Application Program Interface) 122 which provides a standardized interface. Thus, one or more sensors may be added or deleted from Kiosk 101 without major system impact. Furthermore, modifications to the complement of Biometric Device(s) have no impact on the user interface, and modifications to the user interface have no impact on the Biometric Device(s). This is a key feature in permitting modular upgrades with changes in technology and security requirements.

BioAPI 122 is also coupled directly to external Biometric Server 120, providing access to Biometric Database 128 and User Biometric Registration 130. Through the use of Biometric Reader 1-136 through Biometric Reader N-140, passengers have been previously scanned for biometric identifiers. These biometric identifiers have been previously correlated with other passenger identification (e.g., name, address, etc.) by User Biometric Registration 130 and entered into Biometric Database 128. Thus, Biometric Server 120 provides Kiosk 101 with prior passenger biometric identifiers via the interface with BioAPI 122.

Also located within Kiosk 101 are Kiosk Airport Info Application 118, Storage Reader 124, CUSS API (i.e., Common User Application Program Interface) 126, and CUSS Devices 134. Kiosk Airport Info Application 118 provides the data unique to the specific airport in which Kiosk 101 is located. This typically includes the general security alert level, various operational modes, etc. Temporary storage is provided by Storage Reader 124. CUSS API 126 provides a standardized interface to the various internal peripheral devices shown as CUSS Devices 134.

In accordance with the present invention, Kiosk 101 allows a passenger to perform airline check-in activities without the aid of airlines personnel. Kiosk 101 includes one or more User Interface Devices 112, which preferably includes a display providing touch-screen capabilities. A typical kiosk includes at least a display screen and some type of user input device that allows for the entry of data and menu selections. User Interface Devices 112 are coupled directly to Kiosk Check In Application 116. This is a software application that receives input from, and provides output to, the user. For example, Kiosk Check In Application 116 provides the menus the passenger needs to perform his/her check-in activities.

As explained above, Kiosk Check In Application 116 is coupled via BioAPI 122 to one or more biometric devices shown as Biometric Device 1-132 through Biometric Device N-138. BioAPI is a standardized Application Program Interface promulgated by the BioAPI consortium (www.BioAPI-.org). This standardized API is adapted to interface to biometric devices such as fingerprint, iris, retina, and other scanners.

Kiosk Check In Application 116 may, but need not, be further coupled via standardized CUSS API 126 and thus to one or more CUSS Devices 134 such as magnetic card readers, ATB (Automated Ticket and Boarding Pass) printers, etc. CUSS API 126, which operates in accordance with International Air Transport Association (IATA) standard, is an interface designed to hide the specifics of the various CUSS devices from Kiosk Check In Application 116. That is, Kiosk Check In Application 116 only needs to be aware of the existence of a CUSS device, but is not required to understand the protocol needed to communicate with any particular device.

In one embodiment, BioAPI 122 is integrated into CUSS API 126 so that Kiosk Check In Application 116 provides all requests to one software process. CUSS API 126 determines which requests are associated with biometric devices and which are associated with CUSS devices.

Kiosk 101 is coupled via BioAPI 122 to Biometric Server 120. In the preferred mode, Biometric Server 120 provides software capabilities that are used to process biometric data in a manner to be discussed below. Biometric Server 120 is coupled to Biometric Database 128 which in turn is coupled to User Biometric Registration 130. Biometric Database 128 stores information collected from users by User Biometric Registration 130, as is further discussed below.

Kiosk Server 114 is also coupled to Kiosk 101. It interfaces via Kiosk Check In Application 116, and also with the airline-specific hosts. Each host generally is supported by its won data processing system, and is coupled to a dedicated database. In some systems, it may be possible for a single large-scale data processing system to support multiple airline hosts.

In the preferred embodiment, Kiosk Server 114 is coupled to a Check In Database, as shown. Operation of this element is further discussed in accordance with FIGS. 5-7. Storage Reader 124 is directly coupled to BioAPI 122. The nature of this element is discussed in greater detail below.

It is important that Biometric Server 120 and Kiosk Server 114 are separate entities and have separate and independent interfaces with Kiosk 101. These servers are dedicated software processes that may execute on the same, or different, data processing systems. If each of these processes is executing on a respective data processing system, the data processing systems need not be located at the same site. In addition, it is probably likely that both of the software processes are executing at one or more data processing systems that are remotely located as compared to Kiosk 101. The kiosk itself generally resides somewhere within an airport, at a hotel or resort facility, a shopping mall, or at another public location that may be conveniently accessed by users.

Sometime prior to the time the passenger approaches Kiosk 101, the passenger employs User Biometric Registration 130 to perform biometric registration. User Biometric Registration 130, which may be located at a convenient public place such as a airport, includes a manual verification process. For example, a human operator requires the user to verify identification via driver's license, birth certificate, and/or some other means. After manual identity verification is performed, biometric data is collected from the user using one or more biometric devices shown as biometric readers 1 through N. This biometric data to may include finger print scans, retina data, iris scans, voice prints, facial thermograms, handwriting samples, and/or any other type of biometric data that may be used for identification purposes.

One or more biometric readings are stored within Biometric Database 128 in the format shown in FIG. 2 and discussed in detail below. This biometric data stored within Biometric Database 128 is used at a later time to automatically verify user identification.

In operation, a passenger approaches the self-service kiosk of the present invention, which is located in a public area such as at an airport. Employing a user interface device such as touch screen, the user may select as menu, such as a menu that will be used to perform airline check in activities. That menu is provided to the display screen by the kiosk check in application. By selecting the appropriate menu choice, the user is provided with written and/or audible directions concerning how to provide one or more biometric readings. In response to these directions, the user provides the biometric data via biometric devices 1 through N, which may include fingerprint, iris, and/or retina scanners, voice print readers, facial thermo gram readers, handwriting samplers, or any other biometric device that collects biometric data. This data is routed by the kiosk check in application to the biometric server. During this routing process, the kiosk check in application does not need to recognize, interpret, or in any way, process this data. The kiosk check in application merely needs to understand that data received via the BioAPI must be routed to the biometric server.

When biometric data is received by the biometric server, the biometric server retrieves the appropriate entry from the biometric database. The database entry is retrieved by user's frequent flyer number, name, credit card number, and/or any other user indicia that provides unique identification. As discussed below, the database can generally be searched in a more efficient manner using an alpha-numeric frequent flyer number or credit card number than if a name search is performed using a name that is not necessarily unique and therefore must be cross-referenced with other data such as address information. The frequent flyer or credit card number is entered using a magnetic swipe reader provided by the kiosk.

Using biometric identification verification software, the biometric server compares the one or more biometric readings retrieved at the kiosk with the one or more biometric data readings that were retrieved from the biometric database. The biometric server generates match indicia based on this comparison. For example, the server can generate a comparison score that indicates the extent to which the collected data matches the stored data. If the score exceeds a predetermined minimum score, as match is determined to have been made, and the biometric server sends a "verification completed" indication back to the kiosk. Otherwise, the match failed, and a "verification failed" indication is routed back to the kiosk.

When the kiosk check in application receives the verification indication from the biometric server, the check in application decides whether to allow the user to continue with the check in process. If allowed to continue, the user may use a display menu to select a desired function. For example, the user may view flight data for any scheduled flights. This type of request is routed by the kiosk check in application to the kiosk server. Assuming that the check in database is not available (as is discussed in detail in the above identified commonly assigned, co-pending application), the user must specify which airline is associated with the request so that the kiosk server is able to route the request to the host system of the appropriate airline. For example, the user will utilize a menu provided by the kiosk check in application to request flight information for scheduled Airline #1 flights, indicating that the request is to be routed by the kiosk server to the Airline #1 host. The user's flight information will be retrieved from the host's database and returned by the host to the kiosk server. In turn, the information is routed back to the kiosk check in application and is provided to the user. The information can be displayed on a screen, or can be printed using a CUSS device such as a CUSS printer. Optionally, some type of audio feedback may be provided as would be desirable for a vision-impaired user.

Using other menus, the user may make a request to the kiosk check in application to modify or add flight information. As described above, the request is passed to the kiosk server, which routes it to the appropriate airline. If desired, the user can also request that boarding passes, baggage tags, or any other applicable document be printed. In response, the kiosk check-in application makes a request via CUSS API to a CUSS printer causing the boarding passes to be printed on an appropriate document. For example, a boarding pass for a Airline #1 flight will be printed on a Airline #1 document.

As discussed above, the kiosk can be populated with one or more biometric devices. In one embodiment, the kiosk includes a self-test that is executed to determine which type(s) of biometric device(s) populate the kiosk. An indication as to device types is then routed by kiosk check in application to the biometric server so the server can be self-configured to receive the applicable types of biometric data. Alternatively, the server can always be configured to handle any type of data sent by the kiosk, with the type of data being identified by a tag field that accompanies the collected data, or some type of protocol that governs the order in which biometric samples are transferred from the kiosk to the biometric server. In this case, the biometric server does not need to be aware of the type of biometric devices populating the kiosk.

When multiple biometric samples (e.g., fingerprints and iris scan) are provided to the biometric server, the biometric server attempts to read multiple corresponding data readings from biometric database. If a corresponding biometric reading cannot be located within the database (e.g., database stores a fingerprint but no iris scan), the unmatched reading could be discarded. Alternatively, all collected user readings could be considered mandatory such that identification verification fails if corresponding data readings are missing from the biometric database. The action taken in this case could be selectable based on local or countrywide security levels in place at the time. For example, if a particular region is on high alert for a possible terrorist threats, the number of required biometric readings that must match before identification is confirmed would be increased.

Figure 2:
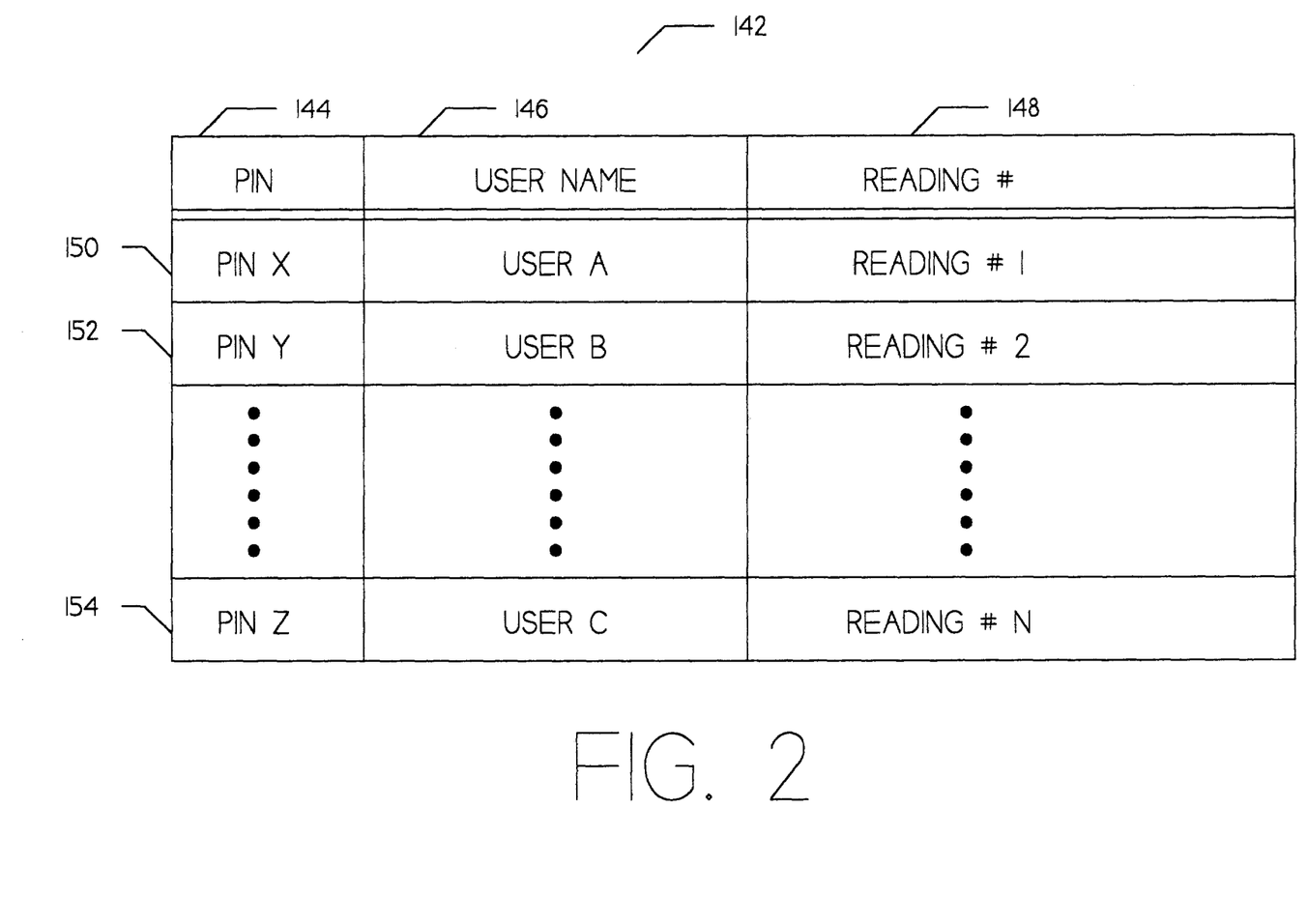
FIG. 2 is a detailed diagram showing the format of the biometric database.

FIG. 2 is a detailed view of format 142 for Biometric Database 128. The user identification includes the user's name, frequent flyer number, date of birth, address, etc. In the preferred embodiment, the collected biometric readings are stored with a PIN (Personal Identification Number) that is assigned to the user. The PIN is a unique alphanumeric identifier which can be used to search the database more efficiently than through the use of a user's name, which may not necessarily be unique.

In accordance with the present invention, the PIN is stored in column 144. Similarly, the user's name and other personal information is stored in column 146, and the biometric reading is stored in column 148. As shown, rows 150, 152, and 154 each represent separate records, each corresponding to a different user. Multiple records may be utilized for a single user and/or additional columns may be added, whenever multiple biometric readings are to be stored for a single user.

Figure 3:
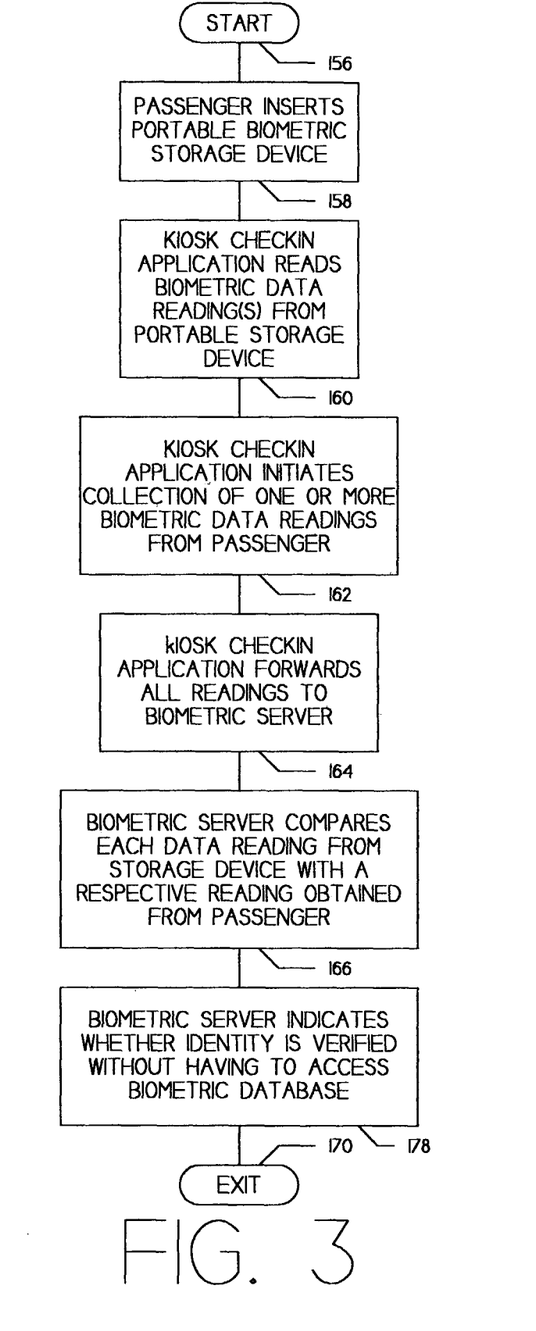
FIG. 3 is a detailed flow diagram showing the sign-on operation of an alternate mode of the present invention.

FIG. 3 is a detailed flow diagram showing operation of an alternate mode of the present invention starting at element 156. The BioAPI is coupled to a storage device reader. This storage device reader is adapted to receive a portable storage device that stores biometric data. During the identification verification process, starting at element 156, the user provides biometric data readings (finger prints, iris scans, etc.) in the manner discussed above using the biometric devices 1 through N provided by the kiosk. These biometric samples are routed to the biometric server for processing. In this embodiment, however, the readings used to verify the collected biometric samples are not retrieved from the biometric database. Instead, they are read by the storage device reader from the portable storage device at element 158. These retrieved readings are routed to a biometric server via elements 160, 162, and 164, where they are compared to the biometric samples collected from the user at element 166. Element 178 indicates the result and exit is via element 170.

This embodiment allows identification verification to be completed more quickly because the biometric server does not need to initiate a search of the biometric database before beginning the verification process. Second, the user is not required to undergo the verification process before using the kiosk. Additionally, this embodiment eliminates the need of retaining biometric identification information in public biometric databases, a practice that may violate the privacy laws of some countries (e.g., some European countries having stringent privacy laws that make it difficult, if not impossible, to collect and retain this type of identification data).

The portable storage device may be any type of smartcard that includes an integrated circuit programmed to store data signals. An example of a token-based biometric smartcard system can be found in U.S. Pat. No. 5,280,527, issued to Gunman et al. In Gullman's system, the user must carry and present a credit card sized token (referred to as a biometric security apparatus) containing a microchip in which is recorded characteristics of the authorized user's voice. This voice recording will be compared against a provided sample of the user's voice before an ATM transaction is allowed to proceed. Such smartcards may also store magnetically encoded biometric data.

Figure 4:
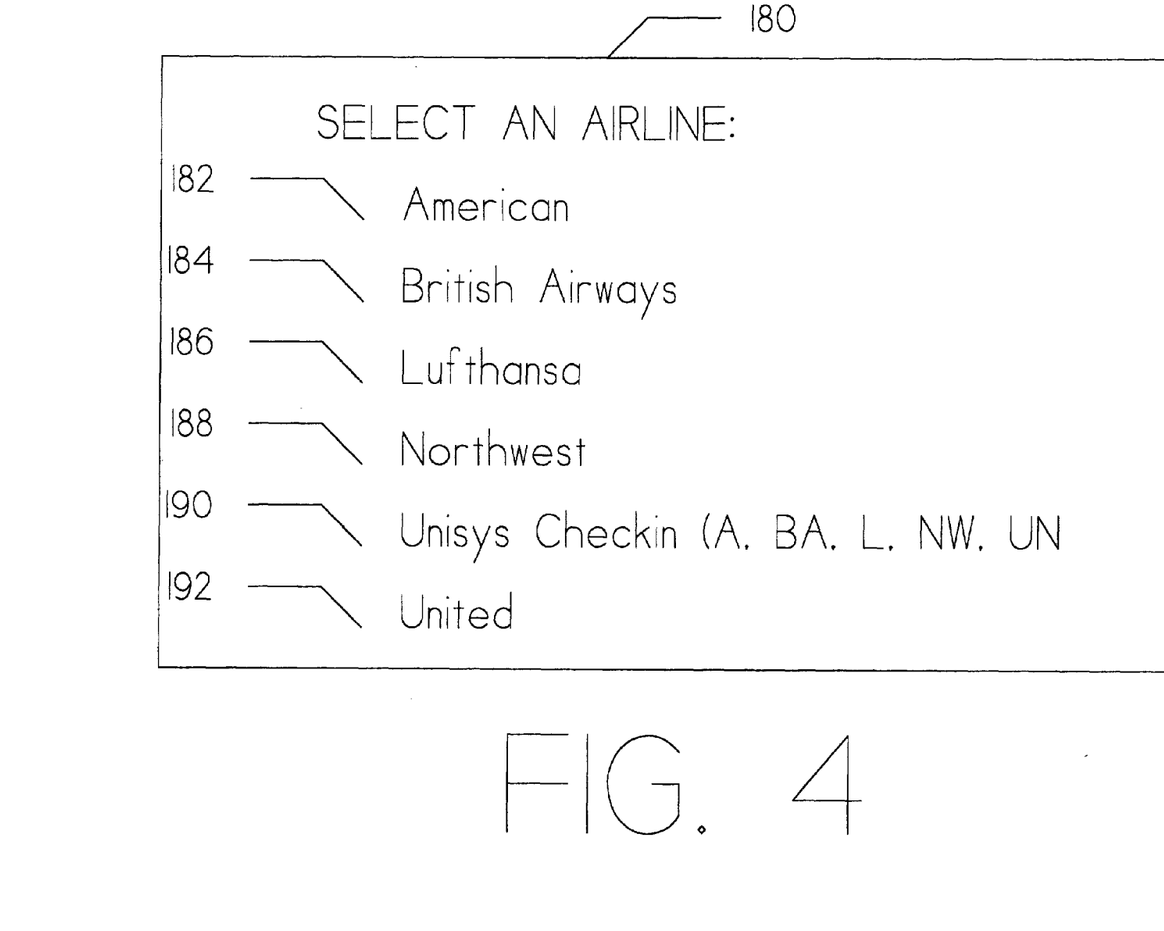
FIG. 4 is a view of the main menu showing the Unisys Check-In option.

FIG. 4 is a view of the display screen menu 180 of the type provided by the self-service kiosk of the present invention. Entries 182, 184, 186, 188, and 192 provide access to check-in functions of the associated American, British Airways, Lufthansa, Northwest, and United airlines, respectively. As previously indicated, this provides access to data as arranged by specific airline carrier. Selection of Unisys Check-In 190, on the other hand, provides access to passenger flight data arranged by passenger identifier. This information includes all passenger information for each of the associated airline carriers, without regard to boundaries between individual carriers.

After selecting Unisys Check-In 190, a subsequent menu screen will be displayed allowing the passenger to specify that flight information is to be obtained. A request is sent by Kiosk Check-in Application 116 to Kiosk Server 114, which forwards the request to the check-in database (see FIG. 1). Unique passenger information such as name and address or social security number is used to retrieve all current flight information. As indicated, this information includes the flights that will depart within a predetermined period of time such as within the next 24 hours. This information is returned via Kiosk Server 114 to Kiosk Check-in Application 116 for display to the passenger. This information may contain flights from multiple airlines, depending on the passenger's travel arrangements. If desired, a single request can be made to print out all boarding passes, tickets, etc. for all airline flights without regard to which airline is associated with the flight. This makes the check-in process much less tedious and time-consuming.

Figure 5:
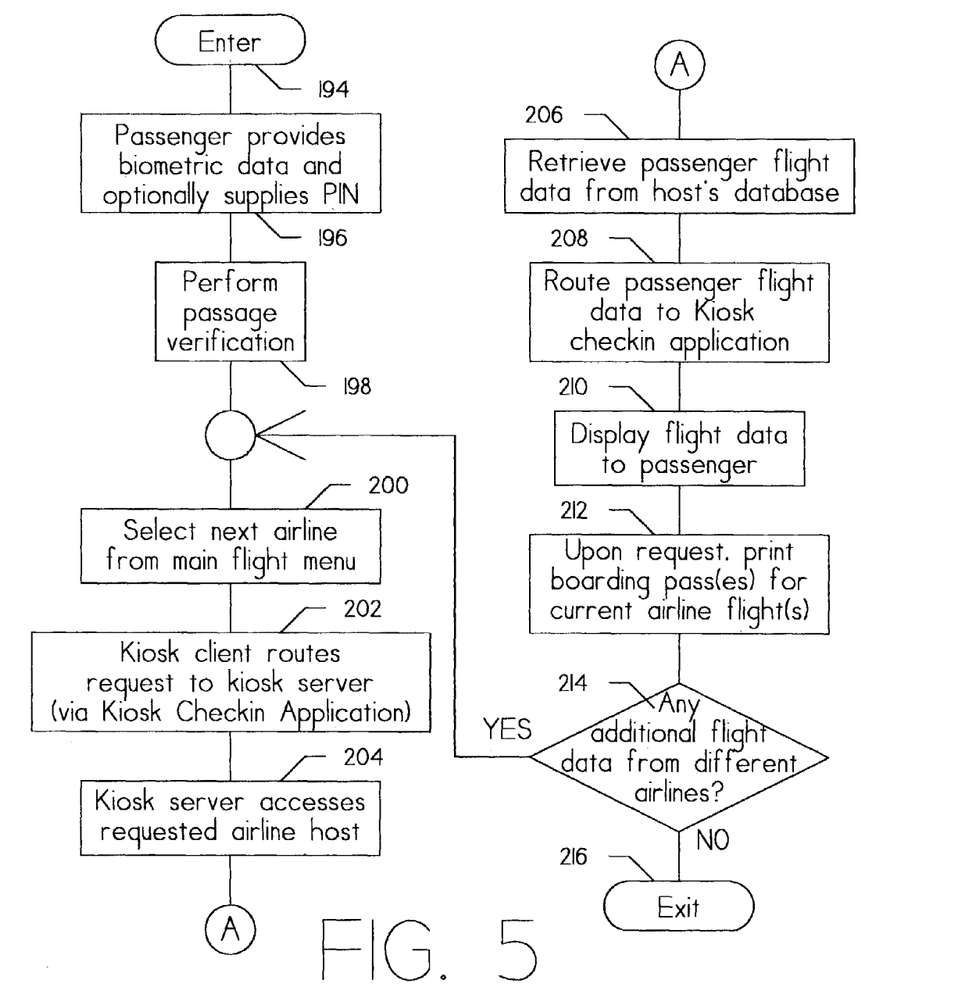
FIG. 5 is a detailed flow diagram showing overall operation without use of the check-in database.

FIG. 5 is a detailed flow diagram showing the overall check-in process not employing the Unisys Check-In feature, without use of the check-in database. Without use of these features, the passenger must undergo a repetitive process to obtain flight information from multiple carriers, each of which having a dedicated host and host database. A large number of legs having different carriers, greatly exacerbates this problem.

Entry is via element 194. At element 196, the passenger provides the required identifiers. Passenger verification occurs at element 198. These steps are session oriented and need not be repeated until the current session is terminated and another is initiated.

Element 200 involves selection of a first (or the next) airline to be referenced from the main flight menu (see also FIG. 4). The kiosk client routes a request to the kiosk server via kiosk check-in application (see also FIG. 1). The corresponding host database (i.e., corresponding to the selected airline carrier from element 200) is accessed at element 204. Element 206 retrieves the flight data for the requesting passenger from the carrier's host database. This data is routed to kiosk check-in application at element 208, which is displayed to the passenger at element 210. Upon passenger request, printing of boarding passes, etc. is accomplished at element 212.

A determination of whether other airline carrier host database need to be accessed at element 214. If yes, control is given to element 200 for the next iteration of the process. If not, exit is via element 216.

Figure 6:
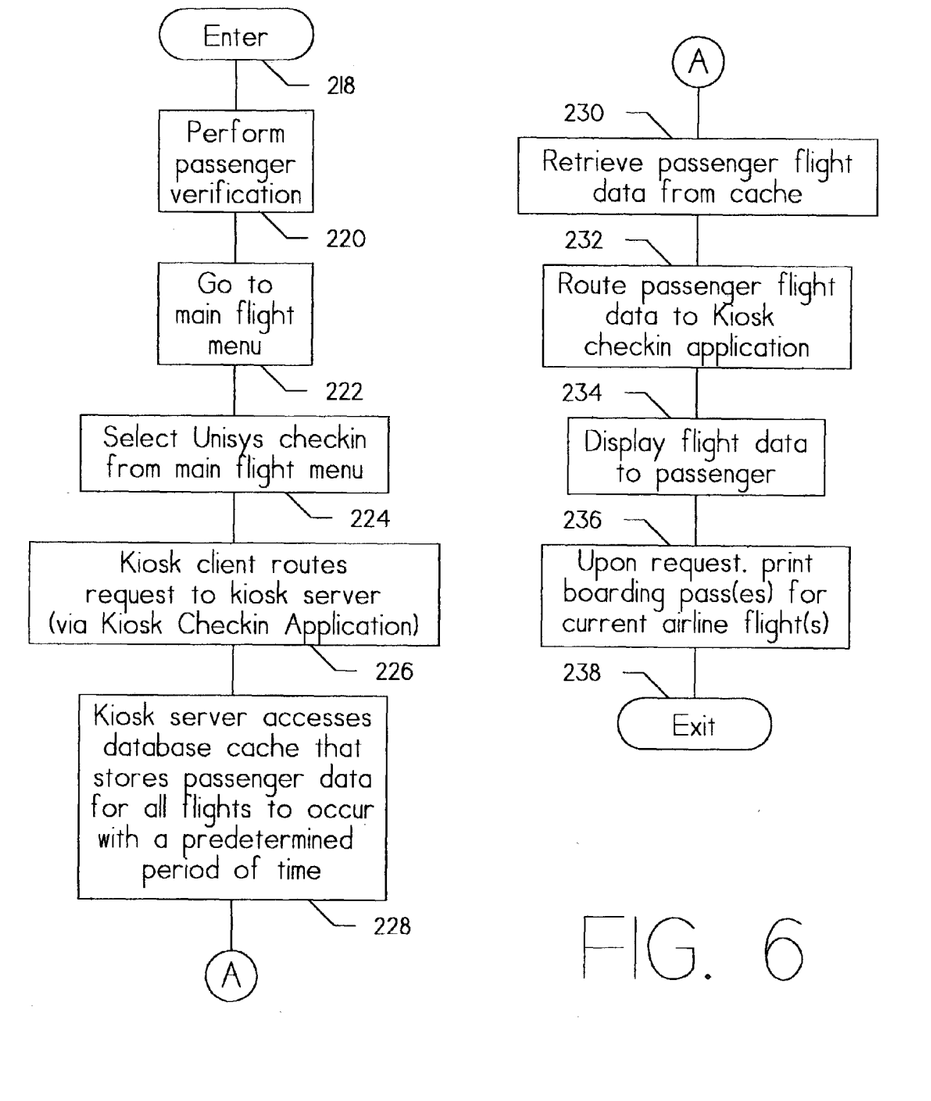
FIG. 6 is a detailed flow diagram showing passenger use of the check-in database.

FIG. 6 is a detailed flow diagram of the process for providing the passenger services of FIG. 5 using the Unisys Check-In option along with the check-in database. Unlike the process of FIG. 5, this process involves a "single pass" and is not iterative. Entry is via element 218. Passenger validation is performed at element 220. The main menu is presented at element 222. At element 224, the passenger selects the Unisys Check-In option. The kiosk client routes the request to the kiosk server via the kiosk check-in application at element 226. At element 228, the kiosk server accesses the database cache that stores the passenger data for all flights to occur within a predetermined period of time. All flight data is extracted for the current passenger at element 230. As explained above, this technique stores all passenger data on a passenger basis, rather than by airline carrier, flight, etc. The data is routed to the kiosk check-in application at element 232. Element 234 displays the flight data to the passenger. Printing is accomplished at element 236 upon request. Exit is via element 238.

Figure 7:
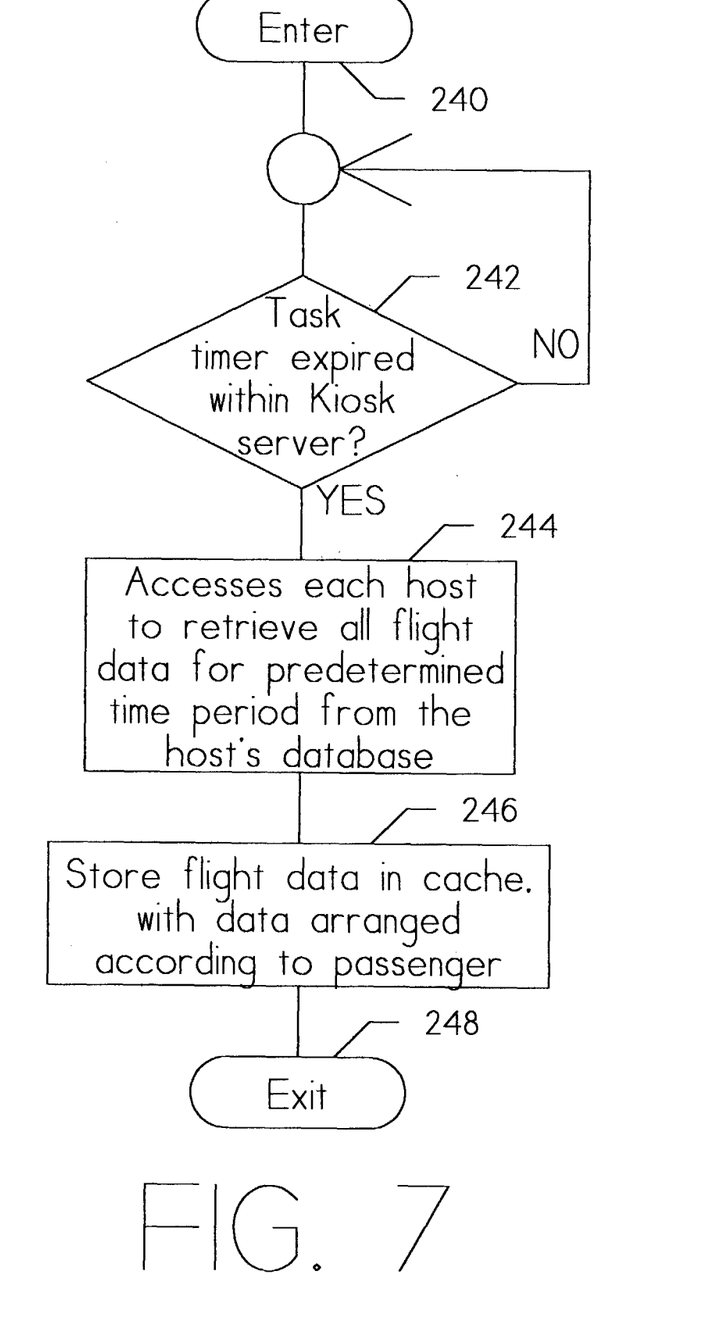
FIG. 7 is a detailed flow diagram showing periodic updating of the check-in database.

FIG. 7 is a detailed flow diagram showing updating of the check-in database from the individual airline carrier host databases. Preferably, this occurs on a 24 hour or 48 hour basis.

Entry is via element 240. Element 242 times the update of the check-in database. Preferably, this would be done on a 24 hour basis with one-half of the check-in database. Assuming that the initial down load was for a 48 hour period, this means that the check-in database would always have at least a 24 hour advanced view. Until the update time approaches, control continues to be returned to element 242. When update time is reached, control is given to element 244 for accesses of each of the individual airline carrier host databases (see also FIG. 1). This data is stored in the check-in database at element 246. Exit is via element 248.

Figure 8:
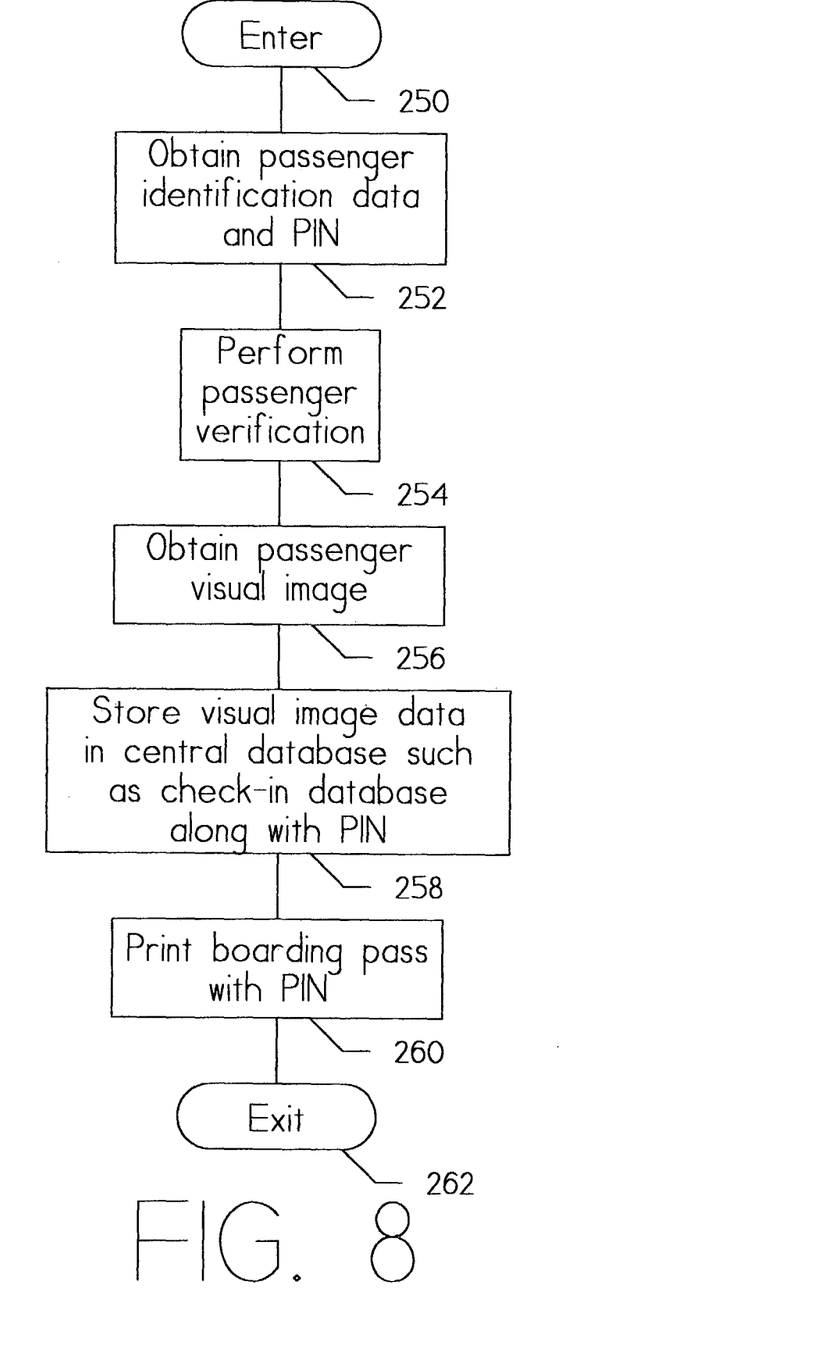
FIG. 8 is a detailed flow chart which shows obtaining the passenger visual image.

FIG. 8 is a detailed flow chart illustrating a process according to the present invention which prints a passenger boarding pass. Entry is via element 250. At element 252, the kiosk obtains the passenger's identification data and Personal Identification Number (PIN). Passenger verification is completed at element 254.

Element 256 obtains a passenger image. This is preferably a simple digital still photograph utilizing a convenient data format. This passenger image is stored for future use at a centrally available database, such as the check-in database (see also FIG. 1). The image is stored in associated with the passenger PIN. Element 260 prints a boarding pass for the passenger, wherein the boarding pass also contains the PIN of the passenger. Exit is via element 262.

Figure 9:
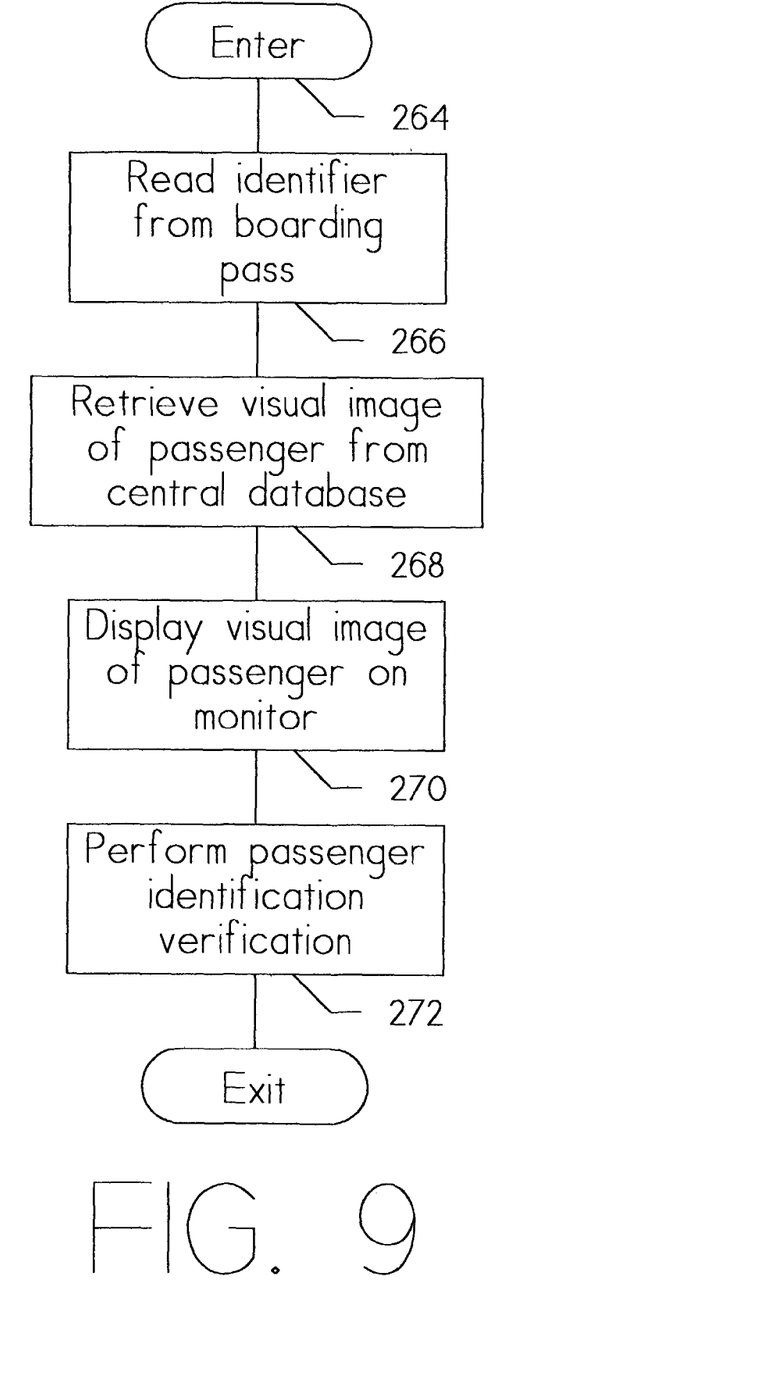
FIG. 9 is a detailed flow chart which shows use of the passenger visual image during boarding.

FIG. 9 is a detailed flow chart showing use of the boarding pass to obtain access at a secure area or to board the plane. Entry is via element 264. At element 266, the passenger identifier (e.g., PIN) is read from the boarding pass. Using this identifier, the passenger's previously stored digital image (see FIG. 8, element 256) is obtained from the check-in database. This passenger image is displayed at element 270. Passenger identification is performed at element 272. This may be accomplished by machine or by security personnel. In most cases, it will be performed by a combination thereof. Exit is as shown.

Figure 10:
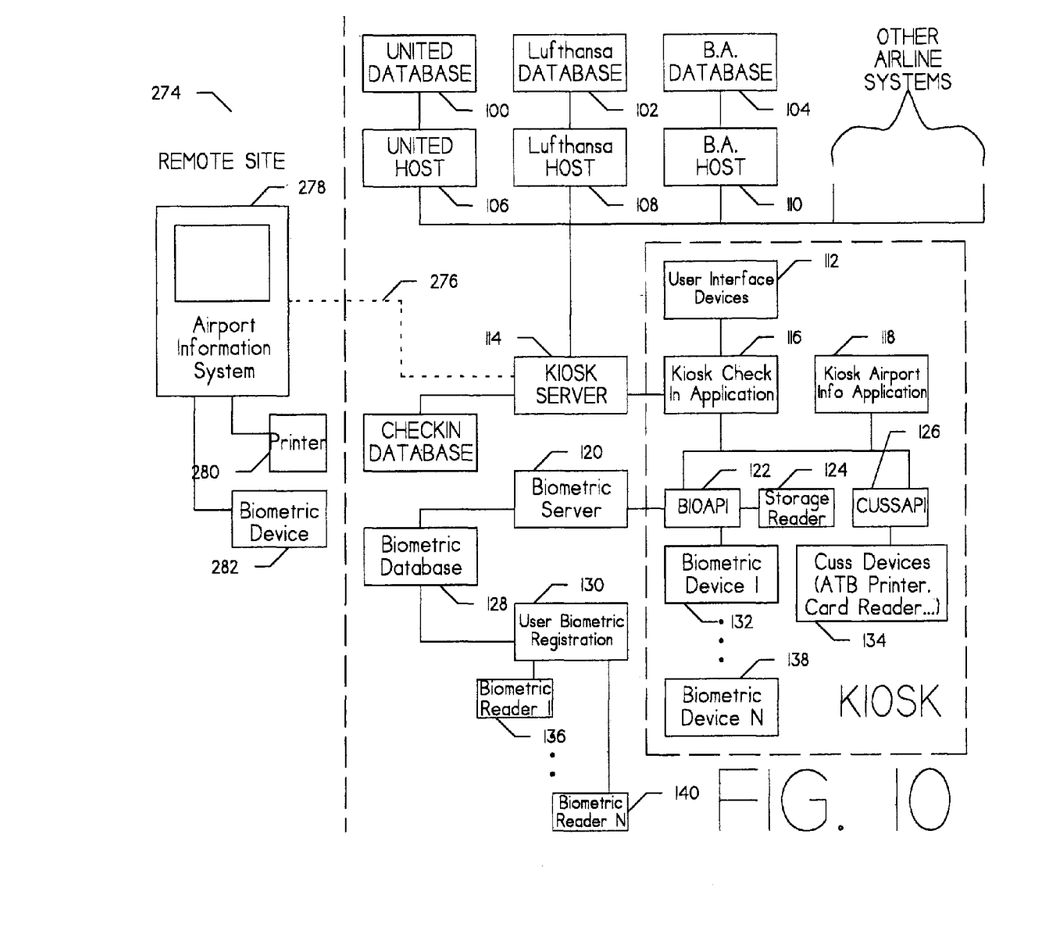
FIG. 10 is a detailed block diagram, similar to FIG. 1, showing remote check-in hardware.

FIG. 10 is a detailed block diagram of the system of the present invention (similar to FIG. 1) showing the addition of the Remote Site Check-in components. Remote site 274 is to preferably a hotel room or other location which is convenient to the passenger, such as a restaurant, taxi, other public transportation vehicle, etc.

Remote display monitor 278 may be a personal computer monitor, but is preferably a television set within the passenger's hotel room. It must have an interface with Kiosk Server 114 via connection 276, which can be telephone lines, fiber optic lines, radio link, etc. In addition, one or more biometric device(s) 282 are couple through monitor 278 to through this interface. To provide the same level of security at remote site 274 as is obtained by the self-service airport check-in kiosk, biometric device(s) 282 directly correspond to biometric reader #1 136 through biometric reader #N 140 which are located at the airport site. Printer 280 provides for remote printing of boarding passes, baggage claim tickets, etc.

The passenger check-in at remote site 274 is preferably equivalent to that which occurs at the self-service airport check-in kiosk. This can be accomplished even though the components at remote site 274 are not identical. For example, printer 280 may be a slower speed and hence lesser cost device than the CUSS device ATB printer 134. Functional equivalence is important, without the need for identical components.

Figure 11:
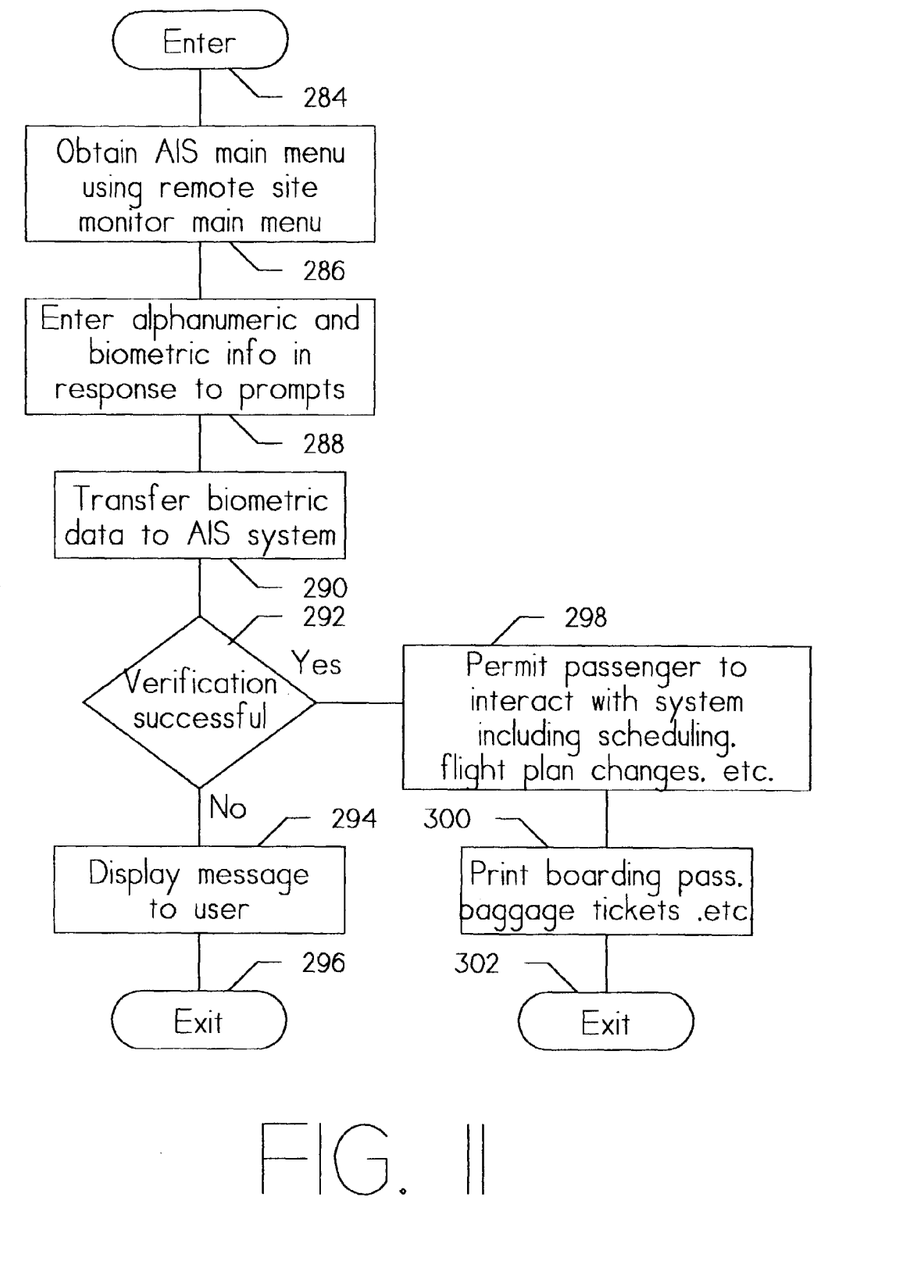

FIG. 11 is a detailed flow chart showing remote passenger check-in. Though the check-in occurs at remote site 274, it is functionally equivalent to the passenger check-in at the airport site explained in detail above.

Entry is via element 284. The passenger obtains the Airport Information System (AIS) on remote monitor 278 (see also FIG. 10) at element 286. Ordinarily, this is accomplished in the hotel room embodiment by accessing the main menu of the remote monitor and selecting the AIS main menu. This is similar to selection of the hotel payment main menu, the pay per view main menu, etc. The passenger provides input of the alphanumeric (e.g., PIN) and biometric information at element 288. This is functionally equivalent to the information required for passenger verification at the airport site.

The alphanumeric and biometric data are transferred via line 276 to Kiosk Server 114 (see also FIG. 10) at element 290. Kiosk Server 114 performs passenger verification as discussed above. If element 292 determines that the passenger verification was invalid, control is given to element 294 for display of a diagnostic message on remote monitor 278, and exit is via element 296. If element 292 determines that the passenger verification was valid, control is given to element 298 wherein the passenger is permitted to perform all of the check-in functions described above, including changing flight reservations, printing boarding pass, etc. The requested printing is performed at element 300. Exit is via element 302.

Having thus described the preferred embodiments of the present invention, those of skill in the art will be readily able to adapt the teachings found herein to yet other embodiments within the scope of the claims hereto attached.

We claim:

1. A system comprising:
   a a remote site airport check-in monitor;
   b a passenger identifier associated with a particular passenger;
   c a first biometric device having a first output responsively coupled to and positioned at the same site as said remote site airport check-in monitor;
   d a user interface software module responsively coupled to said first biometric device and located within said remote site airport check-in monitor which provides a logical interface between said airport check-in monitor and said particular passenger;
   e a biometric device software module located within said remote site airport check-in monitor and responsively coupled to said user interface software module and said first biometric device which processes inputs from said first biometric device;
   f a second biometric device having a second output responsively coupled to said remote site airport check-in monitor; and
   g a passenger verification system containing said second biometric device responsively coupled to but not positioned at the same site as said remote site airport check-in monitor which determines verification of said particular passenger based upon said passenger identifier and said first output of said first biometric device and said second output of said second biometric device responsively coupled to but not positioned at the same site as said remote site airport check-in monitor.

2. A system according to claim 1 wherein said remote site airport check-in monitor further comprises a printer which prints a boarding pass for said particular passenger if and only if said passenger verification system determines valid verification of said particular passenger.

3. A system according to claim 2 wherein said passenger identifier further comprises a Personal Identification Number.

4. A system according to claim 3 wherein said passenger verification system is located at an airport.

5. A system according to claim 4 wherein said remote site airport check-in monitor is located within a hotel room.

6. A system comprising:
   inputting means for inputting a passenger identifier in accordance with a user interface software module;
   reading means responsively coupled to said inputting means for reading a passenger biometric identifier in accordance with a biometric device software module which is responsively coupled to said user interface module;
   second reading means responsively coupled to a second biometric device for reading said passenger biometric identifier at a location different from said reading means; and
   verifying means responsively coupled to said inputting means, said second reading means, and said reading means but not positioned at the same site as said reading means for verifying that said passenger identifier corresponds to said passenger biometric identifier; and
   displaying means responsively coupled to said inputting means and said reading means for displaying information to a passenger.

7. The system of claim 6 wherein said wherein said displaying means further comprises a hotel television set.

8. The system of claim 7 wherein said passenger identifier further comprises a personal identification number.

9. The system of claim 8 wherein said displaying means further comprises a printer which prints boarding passes.

10. A method of remote passenger check-in comprising:

positioning a remote check-in monitor in a convenient place remote from an airport;

identifying a particular passenger at said remote check-in monitor using a personal identifier in accordance with operation of a user interface software module;

identifying said particular passenger using a biometric identifier at said remote check-in monitor in accordance with a biometric identifier software module which is responsively coupled to said user interface software module;

reading said biometric identifier of said particular passenger at a location different from said convenient place remote from said airport;

verifying correspondence between said personal identifier and said biometric identifier at said location different from said convenient place;

printing a boarding pass if said verifying step finds said correspondence between said personal identifier and said biometric identifier, and printing a baggage claim ticket at the request of said passenger.

11. A method according to claim 10 further comprising displaying flight information on said remote check-in monitor.

12. A method according to claim 11 wherein said personal identifier further comprises a Personal Identification Number (PIN).

* * * * *